US012176636B2

(12) United States Patent
Ueda et al.

(10) Patent No.: US 12,176,636 B2
(45) Date of Patent: Dec. 24, 2024

(54) ANTENNA MODULE

(71) Applicant: Murata Manufacturing Co., Ltd., Nagaokakyo (JP)

(72) Inventors: Hideki Ueda, Nagaokakyo (JP); Haruka Arakawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 148 days.

(21) Appl. No.: 17/944,195

(22) Filed: Sep. 14, 2022

(65) Prior Publication Data

US 2023/0020224 A1 Jan. 19, 2023

Related U.S. Application Data

(63) Continuation of application No. PCT/JP2021/006459, filed on Feb. 19, 2021.

(30) Foreign Application Priority Data

Mar. 16, 2020 (JP) ................................ 2020-045421

(51) Int. Cl.
*H01Q 9/42* (2006.01)
*H01Q 9/04* (2006.01)
*H01Q 9/06* (2006.01)

(52) U.S. Cl.
CPC ............... *H01Q 9/42* (2013.01); *H01Q 9/045* (2013.01); *H01Q 9/065* (2013.01)

(58) Field of Classification Search
CPC .... H01Q 1/2283; H01Q 9/0435; H01Q 9/045; H01Q 9/065; H01Q 9/42
See application file for complete search history.

(56) References Cited

U.S. PATENT DOCUMENTS 6,124,830 A * 9/2000 Yuanzhu .............. H01Q 9/0435 343/848
6,320,542 B1 * 11/2001 Yamamoto ............ H01Q 21/24 343/824
2003/0060182 A1 * 3/2003 Nibe ...................... H01P 5/222 455/323

(Continued)

FOREIGN PATENT DOCUMENTS

JP 62-1304 A 1/1987
JP 9-223908 A 8/1997

(Continued)

OTHER PUBLICATIONS

Office Action issued Aug. 22, 2023 in Japanese Patent Application No. 2022-508157, 6 pages.

(Continued)

*Primary Examiner* — Thien M Le
(74) *Attorney, Agent, or Firm* — XSENSUS LLP

(57) ABSTRACT

A distributing/synthesizing circuit includes first to fourth ports. A first radio frequency circuit transmits and receives a radio frequency signal to and from the first port through a first transmission line. A second transmission line is connected to the second port. A first radiating element is connected to the third port and the fourth port through a third transmission line and a fourth transmission line, respectively. The distributing/synthesizing circuit distributes and outputs the radio frequency signal input to the first port to the third port and the fourth port, synthesizes radio frequency signals that are reflected by the first radiating element and that are input to the third port and the fourth port to output the synthesized radio frequency signal to the second port. The second transmission line is longer than all of the first transmission line, the third transmission line, and the fourth transmission line.

20 Claims, 11 Drawing Sheets

(56) References Cited

U.S. PATENT DOCUMENTS

| | | | | | |
|---|---|---|---|---|---|
| 2004/0109476 | A1* | 6/2004 | Baba | H04L 7/033 | 370/516 |
| 2004/0140360 | A1* | 7/2004 | Deguchi | G06K 7/10346 | 235/451 |
| 2006/0035585 | A1* | 2/2006 | Washiro | H01P 5/12 | 455/3.01 |
| 2008/0037770 | A1* | 2/2008 | Emmert | H04M 1/026 | 379/433.01 |
| 2008/0086713 | A1* | 4/2008 | Rautio | G06F 30/367 | 716/136 |
| 2014/0113828 | A1* | 4/2014 | Gilbert | G01K 7/006 | 252/500 |
| 2014/0233436 | A1* | 8/2014 | Long | H04L 5/14 | 370/278 |
| 2015/0372398 | A1* | 12/2015 | Dudorov | H01Q 19/17 | 342/368 |
| 2017/0256835 | A1 | 9/2017 | Mei | | |

FOREIGN PATENT DOCUMENTS

| | | | |
|---|---|---|---|
| JP | 2001-007609 | A | 1/2001 |
| JP | 2001-16003 | A | 1/2001 |
| JP | 2002-217614 | A | 8/2002 |
| JP | 2004-221965 | A | 8/2004 |
| JP | 2009-516944 | A | 4/2009 |
| JP | 2015-76836 | A | 4/2015 |
| WO | 2019/150892 | A1 | 8/2019 |

OTHER PUBLICATIONS

International Search Report and Written Opinion mailed on May 11, 2021, received for PCT Application PCT/JP2021/006459, filed on Feb. 19, 2021, 11 pages including English Translation.

* cited by examiner

ANTENNA MODULE

CROSS-REFERENCE TO RELATED APPLICATIONS

The present application is a continuation of PCT/JP2021/006459, filed Feb. 19, 2021, which claims priority to Japanese patent application JP 2020-045421, filed Mar. 16, 2020, the entire contents of each of which being incorporated herein by reference.

TECHNICAL FIELD

The present disclosure relates to an antenna module.

BACKGROUND ART

A circularly polarized wave patch antenna that radiates circularly polarized waves by combining a rectangular patch antenna and a hybrid circuit is known (see Patent Document 1). The hybrid circuit is formed by combining four transmission lines having an electrical length of ¼ wavelength in a bridge shape. The hybrid circuit distributes a signal input to an input port into two signals with a phase difference of 90° from each other to output the two signals from two output ports. The hybrid circuit includes an isolation port that is not related to input/output of a signal. The isolation port is terminated with a resistor element.

CITATION LIST

Patent Document

Patent Document 1: Japanese Unexamined Patent Application Publication No. 2004-221965

SUMMARY

Technical Problems

A radio frequency signal reflected by the patch antenna and returning to the hybrid circuit is synthesized by the hybrid circuit and then output to the isolation port. When the radio frequency signal output to the isolation port is reflected and then re-input to the isolation port, the re-input radio frequency signal is re-input to the patch antenna from the two output ports. A phase relationship between the radio frequency signals re-input to the patch antenna from the two output ports is different from a phase relationship between radio frequency signals supplied to the patch antenna from the two output ports after being input from the input port. Thus, the circularity (axial ratio) of a circularly polarized wave radiated from the patch antenna is reduced. In general, a non-reflective termination resistor is connected to the isolation port so that a signal output to the isolation port is not reflected and re-input to the isolation port.

When a radio wave radiated from a patch antenna is in a quasi-millimeter wave band being higher than 20 GHz or a millimeter wave band, it is difficult to implement non-reflective termination with a chip resistor element or the like.

An aspect of the present disclosure is to provide an antenna module capable of suppressing re-input of an unnecessary radio frequency signal to a radiating element even in a quasi-millimeter wave band, a millimeter wave band, or the like.

Solution to Problems

According to an aspect of the present disclosure, it is possible to provide an antenna module including a distributing/synthesizing circuit including a first port, a second port, a third port, and a fourth port, a first transmission line, a second transmission line, a third transmission line, and a fourth transmission line respectively connected to the first port, the second port, the third port, and the fourth port, a first radio frequency circuit connected to the first port through the first transmission line and configured to perform at least one of transmission and reception of a radio frequency signal to and from the first port through the first transmission line, and at least one first radiating element connected to the third port and the fourth port through the third transmission line and the fourth transmission line, respectively, wherein the distributing/synthesizing circuit is configured to distribute and output the radio frequency signal input to the first port to the third port and the fourth port, and configured to synthesize radio frequency signals that are reflected by the first radiating element and that are input to the third port and the fourth port to output the synthesized radio frequency signal to the second port, and the second transmission line is longer than each of the first transmission line, the third transmission line, and the fourth transmission line.

According to another aspect of the present invention, it is possible to provide an antenna module including a distributing/synthesizing circuit including a first port, a second port, a third port, and a fourth port, a first transmission line, a second transmission line, a third transmission line, and a fourth transmission line respectively connected to the first port, the second port, the third port, and the fourth port, a first radio frequency circuit connected to the first port through the first transmission line and configured to perform at least one of transmission and reception of a radio frequency signal to and from the first port through the first transmission line, and two external connection terminals individually connected to the third port and the fourth port, wherein the distributing/synthesizing circuit is configured to distribute and output the radio frequency signal input to the first port to the third port and the fourth port, and configured to synthesize radio frequency signals that are reflected by a radiating element connected to the external connection terminal and that are input to the third port and the fourth port to output the synthesized radio frequency signal to the second port, and the second transmission line is longer than all of the first transmission line, the third transmission line, and the fourth transmission line.

Advantageous Effects

When the length of the second transmission line is increased, an attenuation of a radio frequency signal reciprocating in the second transmission line is increased. Thus, a signal level is reduced when an unnecessary radio frequency signal reflected by the radiating element and output to the second port reciprocates in the second transmission line and is re-input to the radiating element. As a result, re-input of the unnecessary radio frequency signal to the radiating element can be suppressed.

DESCRIPTION OF EMBODIMENTS

First Embodiment

An antenna module according to a first embodiment will be described with reference to FIG. 1 and FIG. 2.

Figure 1:
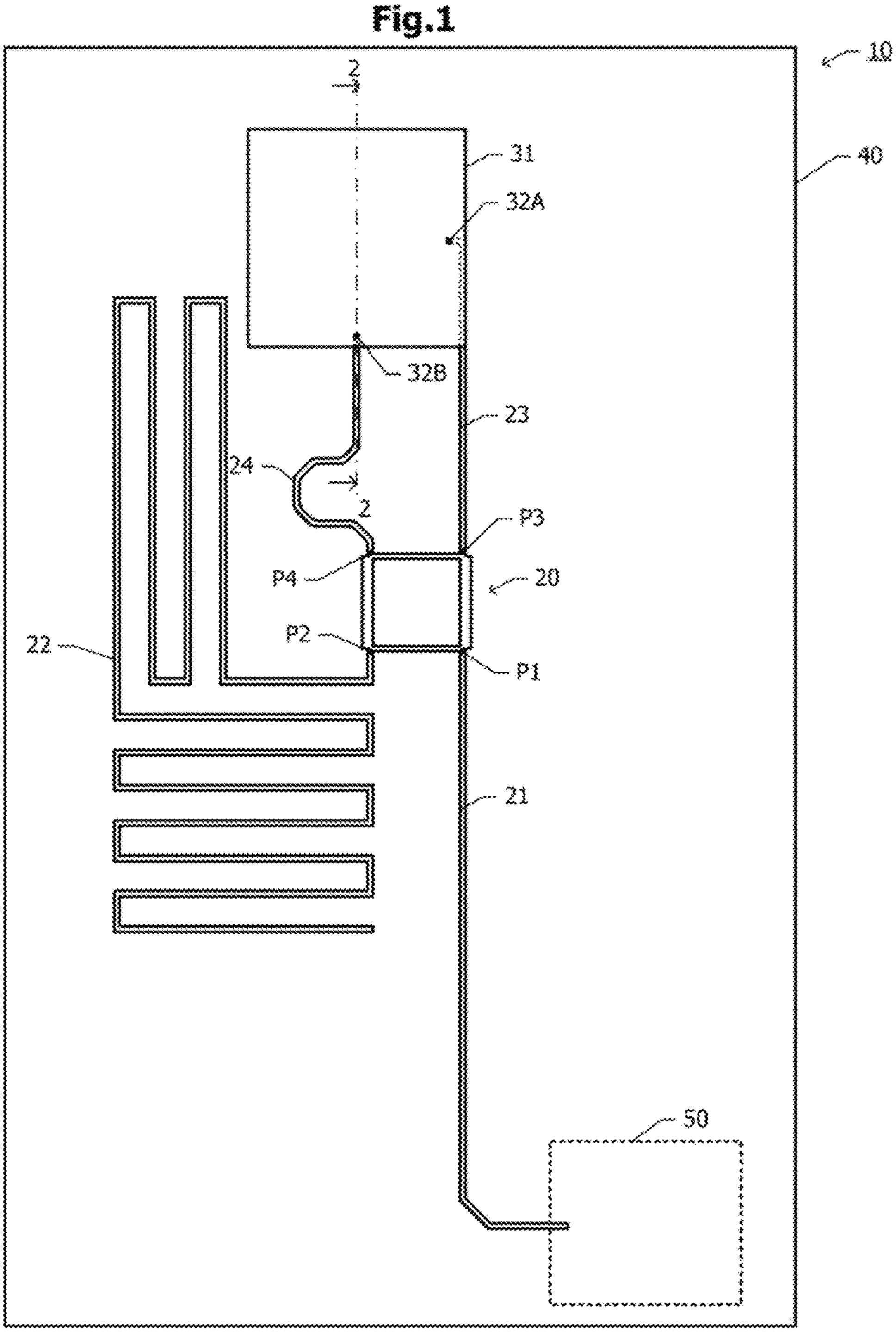
FIG. 1 is a plan view of an antenna module according to a first embodiment.

FIG. 1 is a plan view of an antenna module 10 according to the first embodiment. The antenna module 10 according to the first embodiment includes a distributing/synthesizing circuit 20 provided on a substrate 40, a first transmission line 21, a second transmission line 22, a third transmission line 23, a fourth transmission line 24, and a first radiating element 31, and a radio frequency circuit element 50 that is mounted on the substrate 40.

The distributing/synthesizing circuit 20 is a 90° hybrid circuit can include a first port P1, a second port P2, a third port P3, and a fourth port P4, and further include four transmission lines constituting a bridge circuit. The radio frequency circuit element 50 is connected to the first port P1 of the distributing/synthesizing circuit 20 through the first transmission line 21. The radio frequency circuit element 50 includes a first radio frequency circuit, and the first radio frequency circuit performs at least one of transmission of a radio frequency signal to the first port P1 and reception of a radio frequency signal from the first port P1.

The second transmission line 22 is connected to the second port P2 of the distributing/synthesizing circuit 20. The third port P3 is connected to a feeding point 32A of the first radiating element 31 through the third transmission line 23, and the fourth port P4 is connected to the other feeding point 32B of the first radiating element 31 through the fourth transmission line 24. Characteristic impedances of the first transmission line 21, the second transmission line 22, the third transmission line 23, and the fourth transmission line 24 are identical to each other and are, for example, 50Ω.

Among the four transmission lines of the distributing/synthesizing circuit 20, the characteristic impedance of a transmission line connecting the first port P1 and the second port P2 and the characteristic impedance of a transmission line connecting the third port P3 and the fourth port P4 are identical to the characteristic impedance of the first transmission line 21 and the like. The characteristic impedance of the transmission line connecting the first port P1 and the third port P3 and the characteristic impedance of the transmission line connecting the second port P2 and the fourth port P4 are $\frac{1}{2}^{1/2}$ of the characteristic impedance of the first transmission line 21 and the like. Additionally, electrical lengths of the four transmission lines of the distributing/synthesizing circuit 20 at a resonant frequency of the first radiating element 31 are ¼ of the wavelength.

The first radiating element 31 is formed from a conductor plate or a conductor film and operates as a patch antenna together with a ground conductor (a ground conductor 42 in FIG. 2) provided on the substrate 40. Two virtual straight lines connecting the respective two feeding points 32A and 32B and the center of the first radiating element intersect perpendicularly to each other. The first radiating element 31 resonates at a frequency in a quasi-millimeter wave band being higher than 20 GHz or a millimeter wave band, for example.

A transmission operation of the antenna module will be described below.

The distributing/synthesizing circuit 20 distributes a radio frequency signal input to the first port P1 to the third port P3 and the fourth port P4, and outputs the distributed radio frequency signals with a phase difference of 90°. More specifically, the radio frequency signal output to the fourth port P4 is delayed in phase by 90° with respect to the radio frequency signal output to the third port P3. The third transmission line 23 and the fourth transmission line 24 have the same electrical length. Thus, the radio frequency signals having a phase difference of 90° from each other are supplied to the two feeding points 32A and 32B of the first radiating element. As a result, a radio wave of circular polarization is radiated from the first radiating element 31.

Next, a reception operation of the antenna module will be described.

Circularly polarized waves received by the first radiating element 31 are converted into radio frequency signals. The distributing/synthesizing circuit 20 synthesizes radio frequency signals input to the third port P3 and the fourth port P4 through the third transmission line 23 and the fourth transmission line 24, and outputs the synthesized signal from the first port P1. More specifically, when a radio frequency signal input to the fourth port P4 is delayed in phase by 90° with respect to a radio frequency signal input to the third port P3, the radio frequency signals are synthesized and output from the first port P1. When the first radiating element 31 receives a circularly polarized wave having a turning direction corresponding to this phase relationship, the reception signal is output from the first port P1 and input to the radio frequency circuit element 50 through the first transmission line 21.

Additionally, a part of the radio frequency signal input to the first radiating element 31 is reflected by the first radiating element 31 and is input to the third port P3 and the fourth port P4. The radio frequency signal at the third port P3 is advanced in phase by 90° from the radio frequency signal at the fourth port P4. The radio frequency signals having this phase relationship are synthesized by the distributing/synthesizing circuit 20 and output to the second port P2.

The second transmission line 22 is longer than each of the first transmission line 21, the third transmission line 23, and the fourth transmission line 24. For example, the second transmission line 22 has a meander shape in a plan view. A lumped constant circuit element such as a chip resistor element is not connected to the second transmission line 22. Further, a terminal end of the second transmission line 22 is open when viewed from the second port P2. Note that the terminal end of the second transmission line 22 may be short-circuited to the ground conductor.

Figure 2:
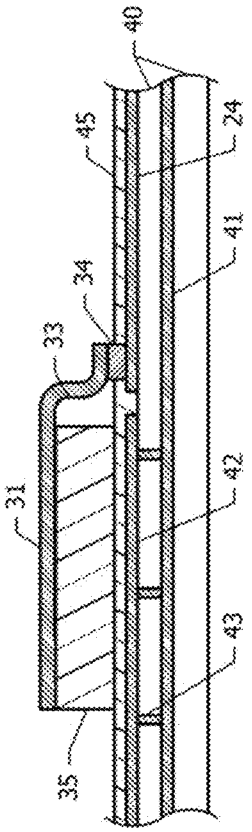
FIG. 2 is a cross-sectional view taken along a dashed-dotted line 2-2 in FIG. 1.

FIG. 2 is a cross-sectional view taken along a dashed-dotted line 2-2 in FIG. 1. The fourth transmission line 24 and the ground conductor 42 are disposed on a surface of the substrate 40 made of a dielectric. Further, a ground conductor 41 is disposed in an inner layer of the substrate 40. The ground conductor 42 on the surface is connected to the ground conductor 41 provided in the inner layer with a plurality of via conductors 43 interposed therebetween.

Although not illustrated in the cross-sectional view in FIG. 2, the first transmission line 21, the second transmission line 22, the third transmission line 23, the distributing/synthesizing circuit 20, and the like that are illustrated in FIG. 1 are disposed on the surface of the substrate 40. The first transmission line 21, the second transmission line 22, the third transmission line 23, and the fourth transmission line 24 constitute a microstrip line together with the ground conductor 41 provided in the inner layer. The radio frequency circuit element 50 (in FIG. 1) is mounted on the substrate 40. As the radio frequency circuit element 50, for example, a radio frequency integrated circuit (RFIC) element, a system-in-package (SiP) as a module including the RFIC element, or the like is used.

The fourth transmission line 24, the ground conductor 42, and the like are covered with a protective film 45. The first radiating element 31 is fixed on the protective film 45 with a dielectric block 35 interposed therebetween. In a plan view, the first radiating element 31 is included in the ground conductor 42. A feeding member 33 extending from the first radiating element 31 is connected to a distal end of the fourth transmission line 24 by using solder 34 or the like. The first radiating element 31 and the feeding member 33 are formed by punching a single metal plate, for example. Note that the feeding member 33 and the fourth transmission line 24 may be coupled by capacitive coupling or inductive coupling. The first radiating element 31 and the ground conductor 42 operate as a patch antenna.

Note that a conductor pattern disposed on the surface of the substrate 40 may serve as the first radiating element 31, and a patch antenna may be constituted by the first radiating element 31 and the ground conductor 41 that is in the inner layer.

Next, an advantageous effect of the first embodiment will be described.

In the first embodiment, radio frequency signals reflected by the first radiating element 31 and transmitted through the third transmission line 23 and the fourth transmission line 24 are synthesized by the distributing/synthesizing circuit 20 and output from the second port P2. The radio frequency signal output from the second port P2 is transmitted through the second transmission line 22, is reflected at the terminal end of the second transmission line 22, and returns to the second port P2.

The radio frequency signal that has returned to the second port P2 is distributed to the third port P3 and the fourth port P4, and re-input to the feeding points 32A and 32B of the first radiating element. A phase relationship of the two radio frequency signals re-input to the feeding points 32A and 32B is opposite to a phase relationship of two radio frequency signals individually supplied to the feeding points 32A and 32B from the radio frequency circuit element 50. For example, for the radio frequency signals supplied from the radio frequency circuit element 50, the radio frequency signal at the feeding point 32B is delayed in phase by 90° from the radio frequency signal at the feeding point 32A. On the other hand, for the radio frequency signals re-input to the first radiating element, the radio frequency signal at the feeding point 32B is advanced in phase by 90° from the radio frequency signal at the feeding point 32A. Thus, the radio frequency signals re-input to the first radiating element 31 reduce the circularity (axial ratio) of a circularly polarized wave radiated from the first radiating element.

In the first embodiment, since the second transmission line 22 is longer than each of the first transmission line 21, the third transmission line 23, and the fourth transmission line 24, the radio frequency signal output from the second port P2 is significantly attenuated before returning to the second port P2 after reciprocating in the second transmission line 22. Thus, it is possible to suppress a decrease in circularity of a circularly polarized wave due to the radio frequency signals re-input to the first radiating element.

Note that even when the second port P2 is terminated by a chip resistor element or the like having an impedance equal to the characteristic impedance of the transmission line, sufficient non-reflective termination cannot be achieved for a radio frequency signal in the quasi-millimeter wave band being higher than 20 GHz or the millimeter wave band. In the first embodiment, the second port P2 is not terminated by a chip resistor element or the like, but is terminated by the second transmission line 22. For this reason, non-reflective termination capable of sufficiently attenuating the radio frequency signal reciprocating in the second transmission line 22 is achieved even for a radio frequency signal in a quasi-millimeter wave band or a millimeter wave band.

In order to maintain sufficient circularity of a circularly polarized wave radiated from the first radiating element 31, a length of the second transmission line 22 may be set such that an attenuation when the radio frequency signal reciprocates in the second transfer line 22 is equal to or larger than 10 dB.

Next, a modified example of the first embodiment will be described.

Although the 90° hybrid circuit is used as the distributing/synthesizing circuit 20 in the first embodiment, a distributing/synthesizing circuit may be used having another configuration and having a function of distributing a radio frequency signal input to the first port P1 to the third port P3 and the fourth port P4, and synthesizing radio frequency signals re-input from the third port P3 and the fourth port P4 to output the synthesized radio frequency signal from the second port P2.

In the first embodiment, the length of the second transmission line 22 is increased by forming the second transmission line 22 into a meander shape, but the second transmission line 22 may be formed in another shape. For example, the second transmission line 22 may be disposed according to the shape of a free region of the substrate 40 (in FIG. 2).

In the first embodiment, a lumped constant circuit element such as a chip resistor element is not connected to the second transmission line 22, and the terminal end thereof is open or short-circuited. However, a surface-mounting passive component such as a resistor element, an inductor element, or a capacitance element may be connected to the second transmission line 22 to terminate the second transmission line 22. Even when the surface-mounting passive component does not function as sufficient non-reflective termination in the quasi-millimeter wave band or the millimeter wave band, the radio frequency signal transmitted in the second transmission line 22 is sufficiently attenuated so that the effect of suppressing re-input of the radio frequency signal to the first radiating element 31 is maintained.

Although the microstrip line is used as the first transmission line 21, the second transmission line 22, the third transmission line 23, and the fourth transmission line 24 in the first embodiment, a transmission line having another structure, for example, a strip line may be used.

Second Embodiment

Next, an antenna module according to a second embodiment will be described with reference to FIG. 3. Hereinafter, description of the configuration common to that of the antenna module 10 (in FIG. 1, FIG. 2) according to the first embodiment will be omitted.

Figure 3:
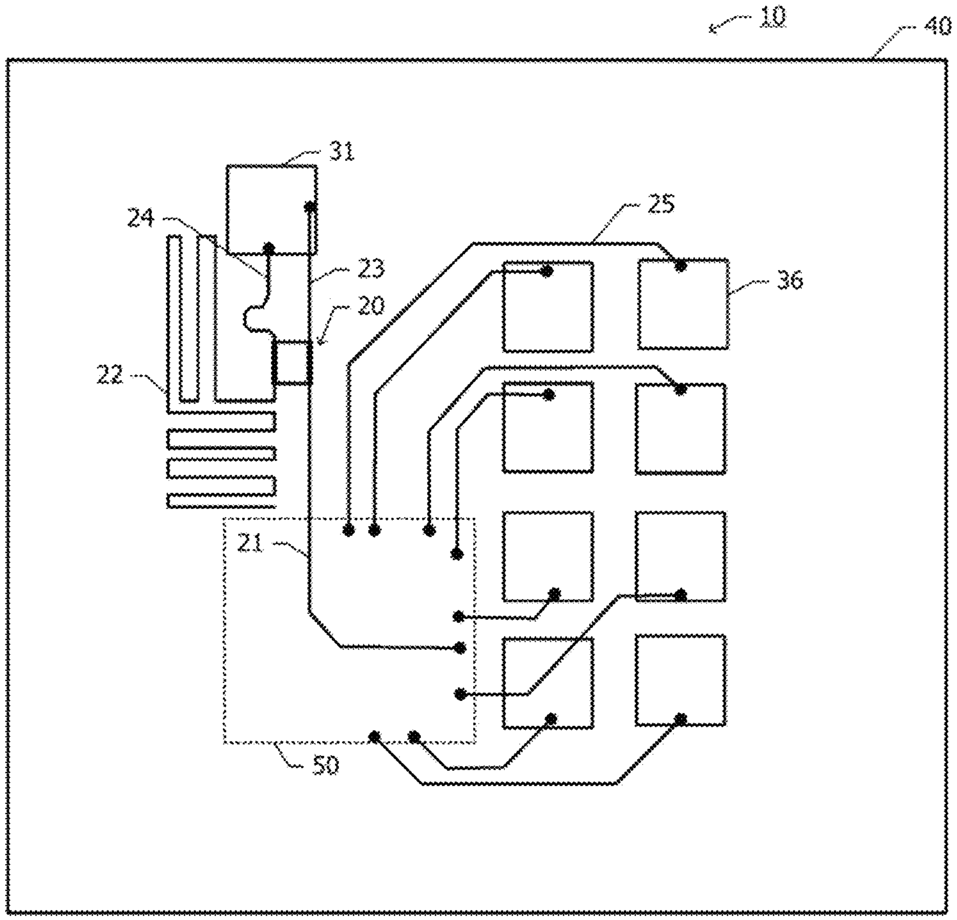
FIG. 3 is a plan view of an antenna module according to a second embodiment.

FIG. 3 is a plan view of the antenna module 10 according to the second embodiment. In the first embodiment, one first radiating element 31 is provided on the surface of the substrate 40, but in the second embodiment, a plurality of second radiating elements 36 are provided in addition to the first radiating element 31. The plurality of second radiating elements 36 are connected to the radio frequency circuit element 50 individually through a plurality of fifth transmission lines 25 provided on the substrate 40. The radio frequency circuit element 50 includes a second radio frequency circuit, and the second radio frequency circuit performs at least one of transmission and reception of a radio frequency signal for each of the second radiating elements 36. The second transmission line 22 is longer than each of the plurality of fifth transmission lines 25. Further, similarly to the first embodiment, the second transmission line 22 is longer than each of the first transmission line 21, the third transmission line 23, and the fourth transmission line 24.

Next, an advantageous effect of the second embodiment will be described.

Also in the second embodiment, since the second transmission line 22 is made longer than the other transmission lines provided on the substrate 40, it is possible to significantly attenuate the radio frequency signal reciprocating in the second transmission line 22. Since this reduces a signal level of the radio frequency signal re-input to the first radiating element 31, it is possible to suppress a decrease in circularity of a circularly polarized wave radiated from the first radiating element 31. Further, in the second embodiment, since the fifth transmission line 25 is made relatively shorter than the second transmission line 22, attenuation of a radio frequency signal transmitted and received between the second radiating element 36 and the radio frequency circuit element 50 can be suppressed.

Next, a modified example of the second embodiment will be described.

In the second embodiment, the first radio frequency circuit that performs at least one of transmission and reception of a radio frequency signal to and from the first radiating element 31, and a second radio frequency circuit that performs at least one of transmission and reception of a radio frequency signal to and from each of the second radiating element 36 are implemented by using the single radio frequency circuit element 50. As the modified example, the first radio frequency circuit and the second radio frequency circuit may be implemented by using different radio frequency circuit elements.

Third Embodiment

Next, an antenna module according to a third embodiment will be described with reference to FIG. 4. Hereinafter, description of the configuration common to that of the antenna module 10 (in FIG. 1, FIG. 2) according to the first embodiment will be omitted.

Figure 4:
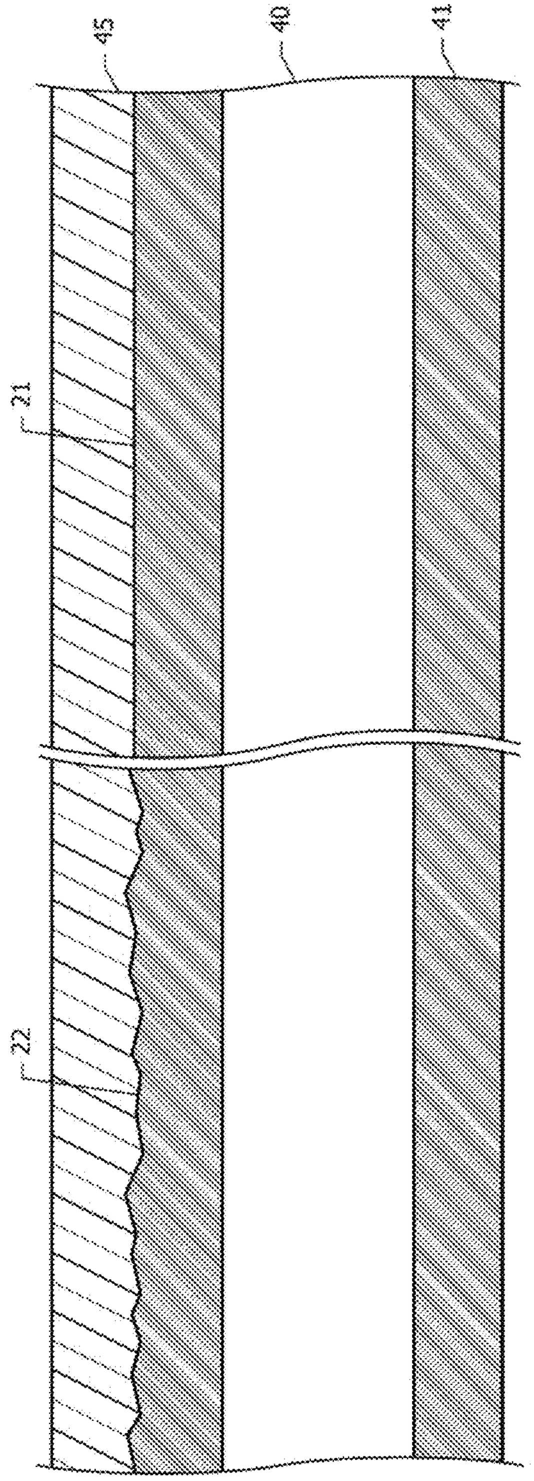
FIG. 4 is a cross-sectional view of a first transmission line and a second transmission line of an antenna module according to a third embodiment.

FIG. 4 is a cross-sectional view of the first transmission line 21 and the second transmission line 22 of the antenna module 10 according to the third embodiment. The first transmission line 21 and the second transmission line 22 are disposed on the surface of the substrate 40, and the ground conductor 41 is disposed in the inner layer. The first transmission line 21 and the second transmission line 22 are covered with the protective film 45.

A surface roughness of the second transmission line 22 is larger than a surface roughness of the first transmission line 21. Note that surface roughnesses of the third transmission line 23 and the fourth transmission line 24 (in FIG. 1) are substantially the same as the surface roughness of the first transmission line 21. For example, an arithmetic average roughness Ra, a root-mean-square height Rq, or the like (for example, JIS B 0601-2001, ISO4287-1997) can be adopted as parameters defining a surface roughness. For example, the surface of the second transmission line 22 can be made rougher than the surfaces of the other transmission lines by masking a region other than the region where the second transmission line 22 is disposed and performing plasma treatment, wet etching treatment, blast treatment, or the like.

Next, an advantageous effect of the third embodiment will be described.

Since the surface of the second transmission line 22 is rougher than the surfaces of the first transmission line 21, the third transmission line 23, and the fourth transmission line 24, a transmission loss per unit length of the second transmission line 22 is larger than transmission losses per unit length of the other transmission lines. Thus, even when the second transmission line 22 is shortened as compared with the case of the first embodiment, it is possible to sufficiently attenuate the radio frequency signal reciprocating in the second transmission line 22. Since the second transmission line 22 can be shortened, the region occupied by the second transmission line 22 on the surface of the substrate 40 can be reduced in size.

Fourth Embodiment

Next, an antenna module according to a fourth embodiment will be described with reference to FIG. 5. Hereinafter, description of the configuration common to that of the antenna module 10 (in FIG. 1, FIG. 2) according to the first embodiment will be omitted.

Figure 5:
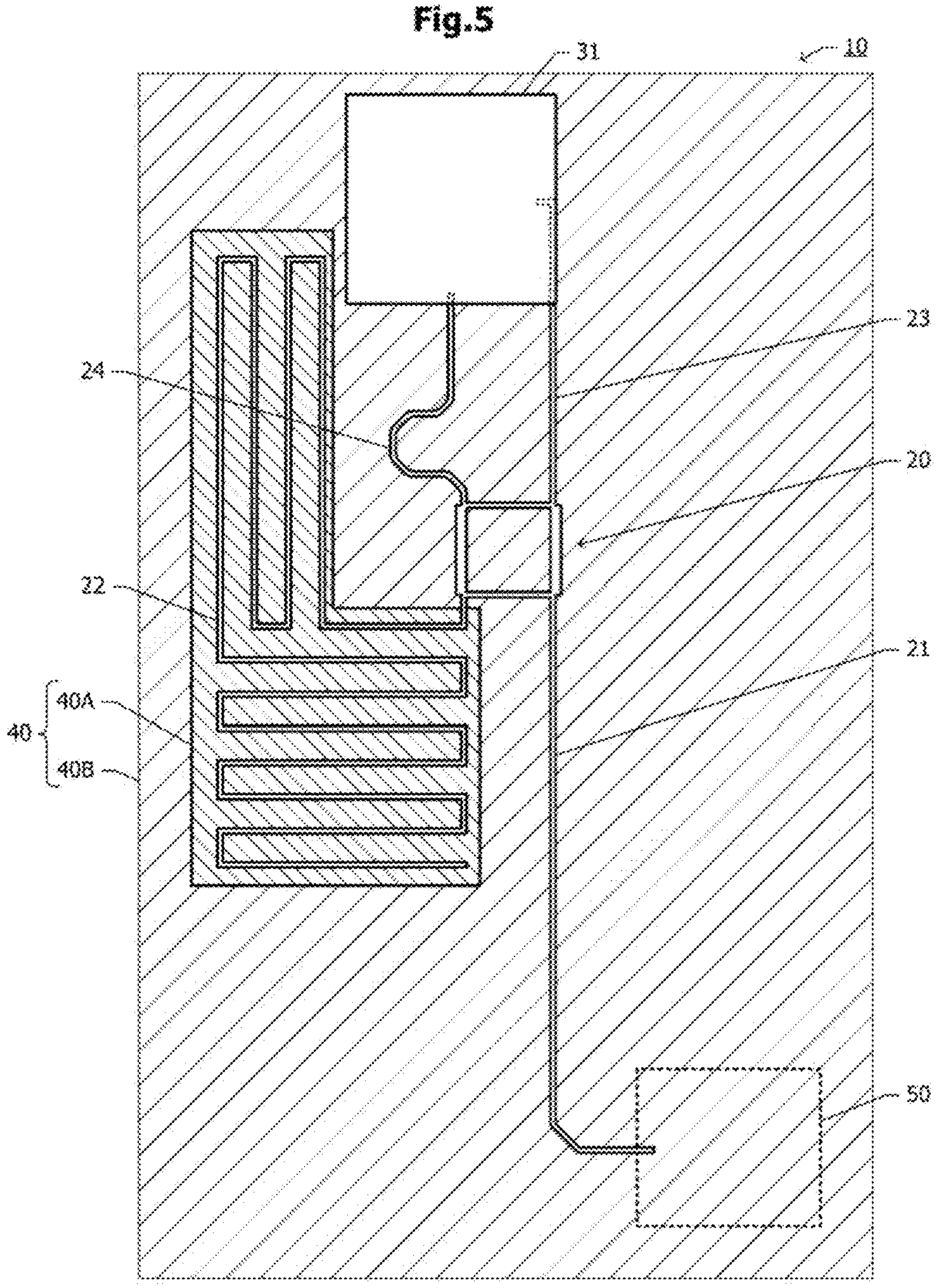
FIG. 5 is a plan view of an antenna module according to a fourth embodiment.

FIG. 5 is a plan view of the antenna module 10 according to the fourth embodiment. In the first embodiment, the substrate 40 (in FIG. 1) is formed of a uniform dielectric material. In contrast, in the fourth embodiment, a dielectric loss tangent (tan δ) of a region 40A of the substrate 40 overlapping the second transmission line 22 in a plan view is larger than a dielectric loss tangent of the other region 40B. In FIG. 5, the region 40A having a relatively large dielectric loss tangent is indicated by relatively dark hatching extending downward to the right, and the other region 40B is indicated by relatively light hatching extending upward to the right. Here, the "dielectric loss tangent" means a dielectric loss tangent at the resonant frequency of the first radiating element 31. Additionally, the dielectric loss tangent of the dielectric material can be measured by using, for example, a resonator method, a coaxial probe method, a reflection/transmission method (S-parameter method), or the like (JIS R 1660-1:2004 or the like). When the dielectric loss tangent is measured by the reflection/transmission method (S-parameter method), either a coaxial/waveguide method or a free-space method can be applied.

For example, by using a glass fiber-containing substrate as the substrate 40 and differentiating the content of glass fibers, the dielectric loss tangents of the two regions 40A and 40B can be made different from each other. Alternatively, the dielectric materials of the two regions 40A and 40B may be made different from each other. When a dielectric constant of the substrate 40 in the vicinity of the second transmission line 22 is different from the dielectric constants in the vicinity of the other transmission lines, it is preferable to make the characteristic impedance of the second transmission line 22 equal to the characteristic impedances of the other transmission lines by making a width of the second transmission line 22 different from widths of the other transmission lines.

Next, an advantageous effect of the fourth embodiment will be described.

Since the dielectric loss tangent of the dielectric material disposed in the vicinity of the second transmission line 22 is larger than the dielectric loss tangent of the dielectric material in the other region, the transmission loss per unit length of the second transmission line 22 is larger than the transmission losses per unit length of the first transmission line 21, the third transmission line 23, and the fourth transmission line 24. Thus, even when the second transmission line 22 is shortened as compared with the case of the first embodiment, it is possible to sufficiently attenuate the radio frequency signal reciprocating in the second transmission line 22. Since the second transmission line 22 can be shortened, the region occupied by the second transmission line 22 on the surface of the substrate 40 can be reduced in size.

Next, a modified example of the fourth embodiment will be described.

In the fourth embodiment, substantially the entire second transmission line 22 is included in the region 40A having the relatively large dielectric loss tangent in a plan view, but the entire second transmission line 22 is not necessarily included in the region 40A. For example, a part of the second transmission line 22 may protrude from the region 40A in a plan view. That is, the dielectric loss tangent of at least a part of the region overlapping the second transmission line 22 in a plan view is only required to be larger than the dielectric loss tangent of the other region. Also in this case, the attenuation of the radio frequency signal reciprocating in the second transmission line 22 is increased.

Fifth Embodiment

Next, an antenna module according to a fifth embodiment will be described with reference to FIG. 6. Hereinafter, description of the configuration common to that of the antenna module 10 (in FIG. 1, FIG. 2) according to the first embodiment will be omitted.

Figure 6:
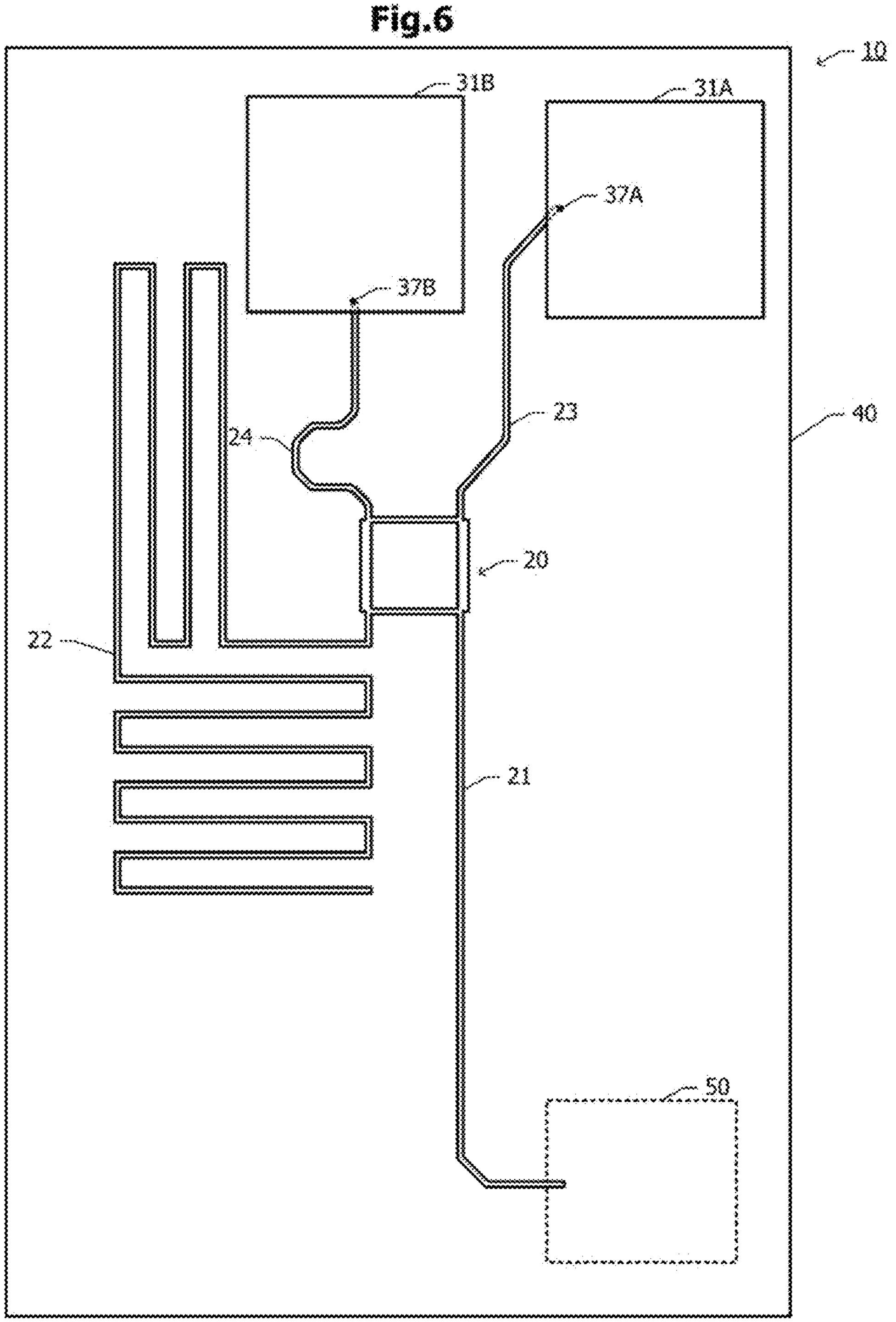
FIG. 6 is a plan view of an antenna module according to a fifth embodiment.

FIG. 6 is a plan view of the antenna module 10 according to the fifth embodiment. In the first embodiment (FIG. 1), the third transmission line 23 and the fourth transmission line 24 are respectively connected to the different feeding points 32A and 32B of one first radiating element 31. In contrast, in the fifth embodiment, the third transmission line 23 is connected to a feeding point 37A of a radiating element 31A, and the fourth transmission line 24 is connected to a feeding point 37B of the other radiating element 31B.

The radiating elements 31A and 31B radiate linearly polarized waves having polarization planes orthogonal to each other. Phases of radio frequency signals supplied to the feeding point 37A of the one radiating element 31A and the feeding point 37B of the other radiating element 31B are different from each other by 90°. Thus, the linearly polarized waves radiated from the two radiating elements 31A and 31B are combined to form a circularly polarized wave.

Next, an advantageous effect of the fifth embodiment will be described.

Also in the fifth embodiment, since the second transmission line 22 is longer than the other transmission lines, similarly to the first embodiment, an advantageous effect can be obtained in that it is possible to suppress a decrease in circularity of a circularly polarized wave.

Sixth Embodiment

Next, an antenna module according to a sixth embodiment will be described with reference to FIG. 7. Hereinafter, description of the configuration common to that of the antenna module 10 (in FIG. 1, FIG. 2) according to the first embodiment will be omitted.

Figure 7:
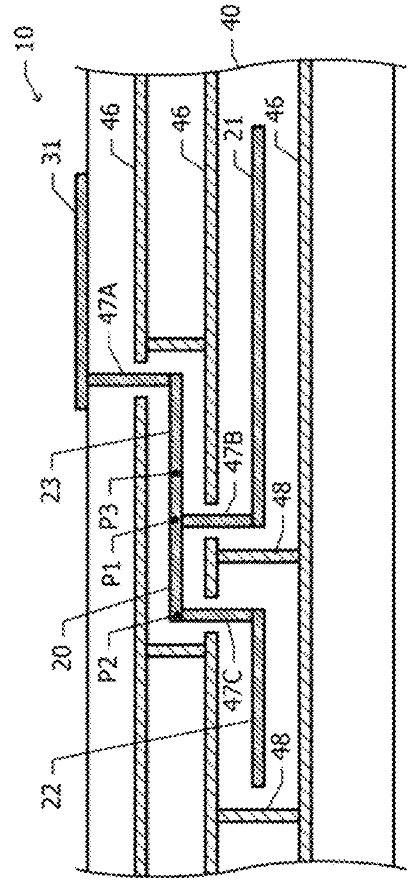
FIG. 7 is a diagram illustrating a positional relationship, in a thickness direction, of transmission lines, a radiating element, and the like constituting an antenna module according to a sixth embodiment.

FIG. 7 is a diagram illustrating a positional relationship, in a thickness direction, of transmission lines, a radiating element, and the like constituting the antenna module 10 according to the sixth embodiment. FIG. 7 focuses on and illustrates the electrical connection of conductor portions, and does not represent a specific cross-sectional structure of the antenna module 10.

In the first embodiment, the first radiating element 31 is provided on the substrate 40 with the dielectric block 35 interposed therebetween. In contrast, in the sixth embodiment, the first radiating element 31 is constituted by a conductor film provided on one surface (hereinafter referred to as an upper surface) of the substrate 40. Further, in the first embodiment, the first transmission line 21, the second transmission line 22, the third transmission line 23, the fourth transmission line 24, and the distributing/synthesizing circuit 20 are disposed on the front surface of the substrate 40. In contrast, in the sixth embodiment, these transmission lines and the distributing/synthesizing circuit 20 are disposed in an inner layer of the substrate 40. In FIG. 7, the first transmission line 21, the second transmission line 22, the third transmission line 23, and the distributing/synthesizing circuit 20 are illustrated.

Two conductor layers and three ground conductors 46 are included in the substrate 40. The third transmission line 23 and the distributing/synthesizing circuit 20 are disposed in the upper conductor layer, and the first transmission line 21 and the second transmission line 22 are disposed in the lower conductor layer. Each conductor layer is sandwiched between the ground conductors 46 in the thickness direction.

The first radiating element 31 is connected to the third transmission line 23 through a via conductor 47A that penetrates the uppermost ground conductor 46. The third transmission line 23 is connected to the third port P3 of the distributing/synthesizing circuit 20. The first transmission line 21 is connected to the first port P1 of the distributing/synthesizing circuit 20 through a via conductor 47B that penetrates the ground conductor 46. The second transmission line 22 is connected to the second port P2 of the distributing/synthesizing circuit 20 through a via conductor 47C that penetrates the ground conductor 46.

A plurality of ground via conductors 48 are disposed so as to surround the second transmission line 22 in a plan view. The plurality of ground via conductors 48 are connected to the two ground conductors 46 individually disposed above and below the second transmission line 22.

Next, an advantageous effect of the sixth embodiment will be described.

In the sixth embodiment, since the first radiating element 31 is formed on the upper surface of the substrate 40 without the dielectric block 35 (in FIG. 2) interposed therebetween, the number of components can be reduced. In addition, the second transmission line 22 having a long wiring length easily becomes a noise source. In the sixth embodiment, the second transmission line 22 is shielded by the ground conductors 46 positioned above and below the second transmission line 22 and the plurality of ground via conductors 48 surrounding the second transmission line 22 in a plan view. Thus, the influence of noise generated from the second transmission line 22 can be reduced. For example, it is possible to suppress disturbance of a radiation pattern of the first radiating element 31, superimposition of noise on a power supply, oscillation due to mutual interference, and the like.

Further, in the sixth embodiment, the third transmission line 23 and the like that are connected to the first radiating element 31 are disposed in the inner layer, and the ground conductor 46 is disposed between the first radiating element 31 and the transmission line 23 in the inner layer. Thus, it is possible to suppress electromagnetic interference between the first radiating element 31 and the transmission line 23 in the inner layer.

Next, a modified example of the sixth embodiment will be described.

In the sixth embodiment, the ground conductors 46 are individually disposed above and below the second transmission line 22, and the second transmission line 22 is surrounded by the plurality of ground via conductors 48 in a plan view. That is, although the second transmission line 22 is three-dimensionally surrounded from all directions, it is not necessary to surround the second transmission line 22 from all directions. A configuration may be adopted in which the ground conductor 46 or the ground via conductor 48 is disposed between the second transmission line 22 and an element that preferably avoid interference with the noise source to weaken coupling therebetween. For example, an integrated circuit element, a power supply line, a radio frequency transmission line, a radiating element, a feeding line of the radiating element, and the like can be cited as elements that preferably avoid interference with the noise source.

Seventh Embodiment

Next, an antenna module according to a seventh embodiment will be described with reference to FIG. 8. Hereinafter, description of the configuration common to that of the antenna module 10 (FIG. 7) according to the sixth embodiment will be omitted.

Figure 8:
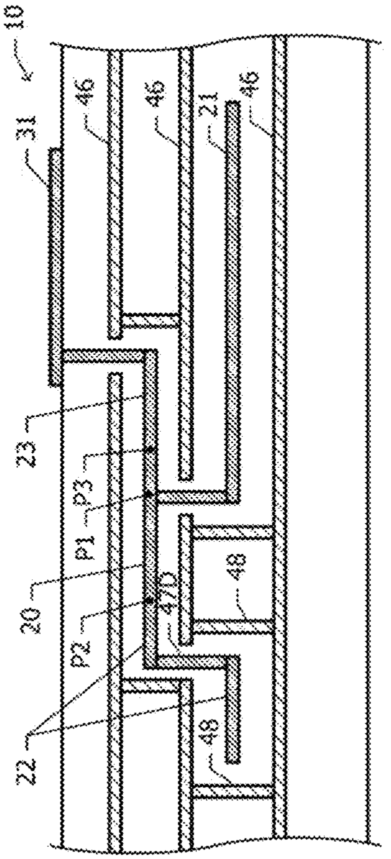
FIG. 8 is a diagram illustrating a positional relationship, in a thickness direction, of transmission lines, a radiating element, and the like constituting an antenna module according to a seventh embodiment.

FIG. 8 is a diagram illustrating a positional relationship, in a thickness direction, of transmission lines, a radiating element, and the like constituting the antenna module 10 according to the seventh embodiment. FIG. 8 focuses on and illustrates the electrical connection of conductor portions and does not represent a specific cross-sectional structure of the antenna module 10.

In the sixth embodiment (FIG. 7), the entire region of the second transmission line 22 is disposed in the lower conductor layer, and one end portion of the second transmission line 22 is connected to the second port P2 of the distributing/synthesizing circuit 20 through the via conductor 47C. In contrast, in the seventh embodiment, the second transmission line 22 is dispersedly disposed in two layers of the upper conductor layer and the lower conductor layer. A portion of the second transmission line 22 disposed in the upper conductor layer and a portion of the second transmission line 22 disposed in the lower conductor layer are connected to each other by using a via conductor 47D. An end portion of the portion of the second transmission line 22 disposed in the upper conductor layer is connected to the second port P2 of the distributing/synthesizing circuit 20.

Next, an advantageous effect of the seventh embodiment will be described.

In the seventh embodiment, portions of the second transmission line 22 disposed in the different conductor layers can be disposed to overlap each other in a plan view. Thus, it is possible to reduce the area of the region occupied by the second transmission line 22. Further, since the portion of the second transmission line 22 disposed in the lower conductor layer is surrounded by the ground conductors 46 and the ground via conductors 48 similarly to the second transmission line 22 (in FIG. 7) of the sixth embodiment, it is possible to reduce the influence of noise generated from the portion of the second transmission line 22 disposed in the lower conductor layer.

Next, a modified example of the seventh embodiment will be described.

In the seventh embodiment, the second transmission line 22 is dispersedly disposed in the two conductor layers, but may be dispersedly disposed in a plurality of, that is, three or more conductor layers.

Eighth Embodiment

Next, an antenna module according to an eighth embodiment will be described with reference to FIG. 9. Hereinafter, description of the configuration common to that of the antenna module 10 (in FIG. 8) according to the seventh embodiment will be omitted.

Figure 9:
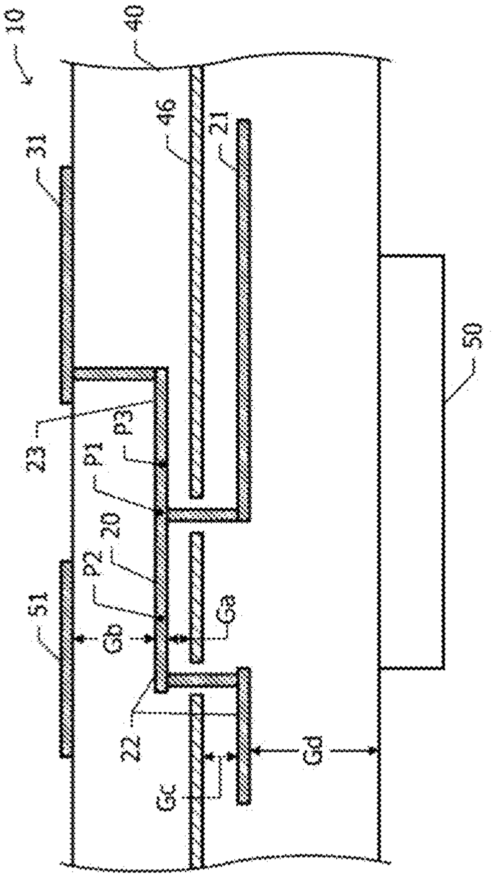
FIG. 9 is a diagram illustrating a positional relationship, in a thickness direction, of transmission lines, a radiating element, and the like constituting an antenna module according to an eighth embodiment.

FIG. 9 is a diagram illustrating a positional relationship, in a thickness direction, of transmission lines, a radiating element, and the like constituting the antenna module 10 according to the eighth embodiment. FIG. 9 focuses on and illustrates the electrical connection of conductor portions and does not represent a specific cross-sectional structure of the antenna module 10.

In the seventh embodiment (in FIG. 8), the ground conductor 46 is disposed between the distributing/synthesizing circuit 20, the second transmission line 22, the third transmission line 23, and the like that are disposed in the upper conductor layer and the first radiating element 31 on the upper surface, and the ground conductor 46 is also disposed below the first transmission line 21, the second transmission line 22, and the like that are disposed in the lower conductor layer. In contrast, in the eighth embodiment, these ground conductors are not disposed. The ground conductor 46 is disposed between the distributing/synthesizing circuit 20, the second transmission line 22, the third transmission line 23, and the like that are disposed in the upper conductor layer and the first transmission line 21, the second transmission line 22, and the like that are disposed in the lower conductor layer.

In FIG. 8, radiating elements other than the first radiating element 31 and transmission lines are not illustrated on the upper surface of the substrate 40, and the radio frequency circuit element 50 (in FIG. 1) mounted on the lower surface of the substrate 40 is not illustrated. In contrast, FIG. 9 illustrates a conductor pattern 51 of a radiating element, a transmission line, or the like disposed on the upper surface of the substrate 40, and the radio frequency circuit element 50 mounted on the lower surface of the substrate 40.

Intervals in the thickness direction from the second transmission line 22 disposed in the upper conductor layer to the ground conductor 46 and to the conductor pattern 51 disposed on the upper surface of the substrate 40 are denoted by Ga and Gb, respectively. Intervals in the thickness direction from the second transmission line 22 disposed in the lower conductor layer to the ground conductor 46 and to the lower surface of the substrate 40 are denoted by Gc and Gd, respectively. In the eighth embodiment, the relationships of Ga<Gb and Gc<Gd are established.

Next, an advantageous effect of the eighth embodiment will be described.

In the eighth embodiment, since the relationships of Ga<Gb and Gc<Gd are established, electric power is concentrated to a space between the lower surface of the second transmission line 22 disposed in the upper conductor layer and the upper surface of the ground conductor 46 and a space between the upper surface of the second transmission line 22 disposed in the lower conductor layer and the lower surface of the ground conductor 46. Thus, interference between the second transmission line 22 and the conductor pattern 51, and between the second transmission line 22 and the radio frequency circuit element 50, which serve as noise sources, is suppressed. As a result, an advantageous effect can be obtained in that the conductor pattern 51 and the radio frequency circuit element 50 are less likely to be affected by noise from the second transmission line 22.

Ninth Embodiment

Next, an antenna module according to a ninth embodiment will be described with reference to FIG. 10. Hereinafter, description of the configuration common to that of the antenna module 10 (in FIG. 1, FIG. 2) according to the first embodiment will be omitted.

Figure 10:
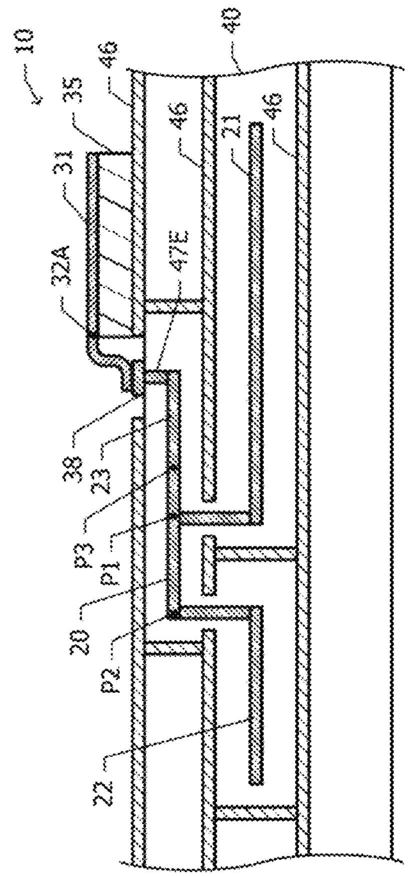
FIG. 10 is a diagram illustrating a positional relationship, in a thickness direction, of transmission lines, a radiating element, and the like constituting an antenna module according to a ninth embodiment.

FIG. 10 is a diagram illustrating a positional relationship, in a thickness direction, of transmission lines, a radiating element, and the like constituting the antenna module 10 according to the ninth embodiment. FIG. 10 focuses on and illustrates the electrical connection of conductor portions and does not represent a specific cross-sectional structure of the antenna module 10.

In the first embodiment (FIG. 2), the first transmission line 21, the second transmission line 22, the third transmission line 23, the fourth transmission line 24, the distributing/synthesizing circuit 20, and the like are disposed on the upper surface of the substrate 40. In contrast, in the ninth embodiment, these transmission lines, the distributing/synthesizing circuit 20 and the like are disposed in an inner layer of the substrate 40. The transmission lines and the distributing/synthesizing circuit 20 in the inner layer of the substrate 40 have the same configuration as those of the antenna module according to the sixth embodiment (in FIG. 7), for example.

An external connection terminal 38 and a ground conductor 46 are disposed on the upper surface of the substrate 40. The external connection terminal 38 is connected to the third transmission line 23 in the inner layer through the via conductor 47E. The dielectric block 35 holding the first radiating element 31 is disposed on the ground conductor 46 positioned on the upper surface of the substrate 40. The feeding point 32A of the first radiating element 31 is connected to the external connection terminal 38. Although not illustrated in FIG. 10, the other feeding point 32B (in FIG. 1) of the first radiating element 31 is also connected to the fourth transmission line 24 through the other external connection terminal and via conductor.

Next, an advantageous effect of the ninth embodiment will be described.

In the ninth embodiment, the ground conductor 46 is disposed between the first radiating element 31 and the transmission line and the like positioned in the inner layer of the substrate 40. Thus, coupling between the first radiating element 31 and the transmission line positioned in the inner layer of the substrate 40 is reduced, and deterioration in radiation characteristics of the first radiating element 31 is suppressed.

Tenth Embodiment

Next, an antenna module according to a tenth embodiment will be described with reference to FIG. 11A and FIG. 11B. Hereinafter, description of the configuration common to that of the antenna module 10 (in FIG. 10) according to the ninth embodiment will be omitted.

Figure 11A:
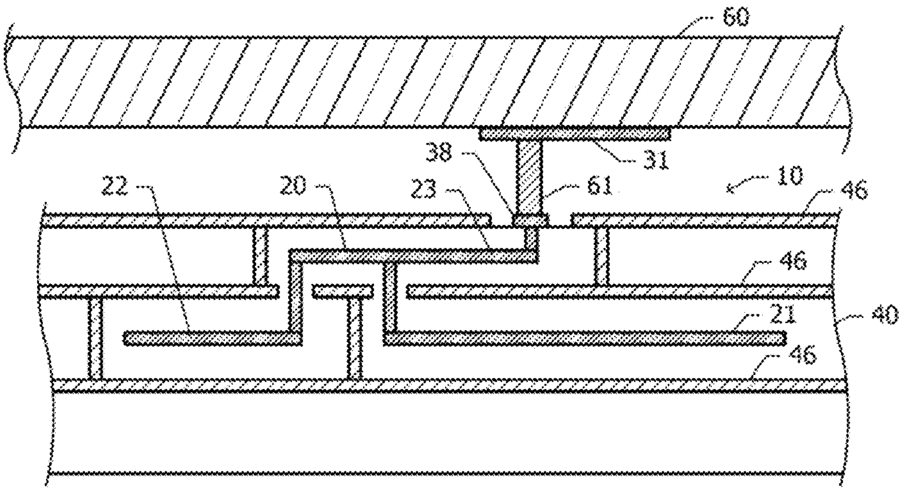
FIG. 11A and FIG. 11B are diagrams illustrating a positional relationship, in a thickness direction, of transmission lines, a radiating element, and the like constituting an antenna module according to a tenth embodiment, and a first radiating element disposed outside.
Figure 11B:
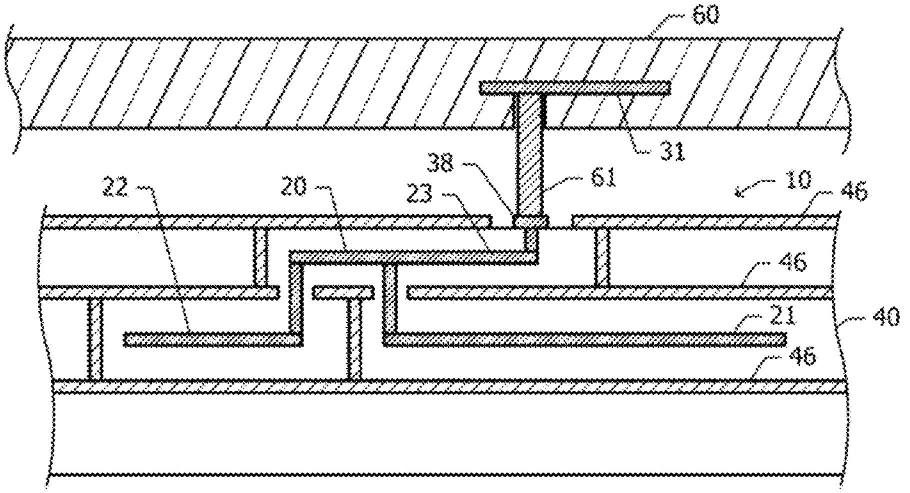

FIG. 11A and FIG. 11B are diagrams illustrating a positional relationship, in a thickness direction, of transmission lines, a radiating element, and the like constituting the antenna module 10 according to the tenth embodiment, and the first radiating element 31 disposed outside. The FIG. 11A and FIG. 11B focus on and illustrate the electrical connection of conductor portions and do not represent a specific cross-sectional structure of the antenna module 10.

In the ninth embodiment (in FIG. 10), the antenna module 10 includes the first radiating element 31. In contrast, the antenna module 10 according to the tenth embodiment is not provided with the first radiating element 31, but is provided with the external connection terminal 38 for connection to the first radiating element 31 provided outside.

In the example illustrated in FIG. 11A, the first radiating element 31 is provided on an inner surface of a housing 60 that accommodates the antenna module 10. In the example illustrated in FIG. 11B, the first radiating element 31 is embedded in the housing 60. The first radiating element 31 and the external connection terminal 38 of the antenna module 10 are connected by using a conductor column 61. For example, a pogo pin or the like can be used as the conductor column 61.

Next, an advantageous effect of the tenth embodiment will be described.

In the tenth embodiment, the first radiating element 31 can be disposed at a desired position outside the antenna module 10. Thus, it is possible to obtain an advantageous effect by increasing the degree of freedom of the position where the first radiating element 31 is disposed.

Each of the embodiments described above is merely an example, and it is needless to say that partial replacement or combination of configurations described in different embodiments can be made. Similar functions and effects due to similar configurations of a plurality of embodiments are not sequentially described for each embodiment. Furthermore, the present invention is not limited to the embodiments described above. For example, it will be apparent to those skilled in the art that various modifications, improvements, combinations, and the like can be made.

REFERENCE SIGNS LIST

10 ANTENNA MODULE
20 DISTRIBUTING/SYNTHESIZING CIRCUIT
21 FIRST TRANSMISSION LINE
22 SECOND TRANSMISSION LINE
23 THIRD TRANSMISSION LINE
24 FOURTH TRANSMISSION LINE
25 FIFTH TRANSMISSION LINE
31 FIRST RADIATING ELEMENT
31A, 31B RADIATING ELEMENT
32A, 32B FEEDING POINT
33 FEEDING MEMBER
34 SOLDER
35 DIELECTRIC BLOCK
36 SECOND RADIATING ELEMENT
37A, 37B FEEDING POINT
38 EXTERNAL CONNECTION TERMINAL
40 SUBSTRATE
40A REGION HAVING LARGE DIELECTRIC LOSS TANGENT
40B REGION HAVING SMALL DIELECTRIC LOSS TANGENT
41, 42 GROUND CONDUCTOR
43 VIA CONDUCTOR
54 PROTECTIVE FILM
46 GROUND CONDUCTOR
47A, 47B, 47C, 47D, 47E VIA CONDUCTOR
48 GROUND VIA CONDUCTOR
50 RADIO FREQUENCY CIRCUIT ELEMENT
51 CONDUCTOR PATTERN OF RADIATING ELEMENT, TRANSMISSION LINE, AND THE LIKE
60 HOUSING
61 CONDUCTOR COLUMN
P1 FIRST PORT
P2 SECOND PORT
P3 THIRD PORT
P4 FOURTH PORT

The invention claimed is:

1. An antenna module comprising:

a distributing/synthesizing circuit including a first port, a second port, a third port, and a fourth port, and configured to distribute and synthesize radio frequency signals;

a first transmission line, a second transmission line, a third transmission line, and a fourth transmission line respectively connected to the first port, the second port, the third port, and the fourth port;

a first radio frequency circuit connected to the first port through the first transmission line and configured to perform at least one of transmission and reception of a radio frequency signal via the first port through the first transmission line; and at least one first radiating element connected to the third port and the fourth port through the third transmission line and the fourth transmission line, respectively, wherein the distributing/synthesizing circuit is configured to:

distribute the radio frequency signal input to the first port, to the third port, and to the fourth port, synthesize radio frequency signals that are reflected by the first radiating element and that are input to the third port and the fourth port, and output the synthesized radio frequency signal to the second port, and wherein the second transmission line is longer than each of the first transmission line, the third transmission line, and the fourth transmission line.

2. The antenna module according to claim 1, wherein the distributing/synthesizing circuit, the first transmission line, the second transmission line, the third transmission line, and the fourth transmission line are provided on a common substrate, and the antenna module further comprises:

at least one second radiating element provided on the substrate;

a second radio frequency circuit configured to perform at least one of transmission and reception of a radio frequency signal to and from each of the at least one second radiating element; and a fifth transmission line provided on the substrate and connected between the second radio frequency circuit and each of the at least one second radiating element, and the second transmission line is longer than the fifth transmission line.

3. The antenna module according to claim 2, wherein a surface roughness of the second transmission line is larger than surface roughnesses of each of the first transmission line, the third transmission line, and the fourth transmission line.

4. The antenna module according to claim 2, wherein a dielectric loss tangent of at least a part of a dielectric material disposed in a region overlapping the second transmission line in a plan view is larger than a dielectric loss tangent of a dielectric material disposed in a region overlapping the first transmission line, the third transmission line, and the fourth transmission line.

5. The antenna module according to claim 2, wherein the first radio frequency circuit supplies a radio frequency signal with a frequency equal to or higher than 20 GHz to the first radiating element.

6. The antenna module according to claim 2, wherein a chip resistor element is not connected to the first transmission line.

7. The antenna module according to claim 1, wherein a surface roughness of the second transmission line is larger than surface roughnesses of each of the first transmission line, the third transmission line, and the fourth transmission line.

8. The antenna module according to claim 1, wherein a dielectric loss tangent of at least a part of a dielectric material disposed in a region overlapping the second transmission line in a plan view is larger than a dielectric loss tangent of a dielectric material disposed in a region overlapping the first transmission line, the third transmission line, and the fourth transmission line.

9. The antenna module according to claim 1, wherein the first radio frequency circuit supplies a radio frequency signal with a frequency equal to or higher than 20 GHz to the first radiating element.

10. The antenna module according to claim 1, wherein a chip resistor element is not connected to the first transmission line.

11. An antenna module comprising:

a distributing/synthesizing circuit including a first port, a second port, a third port, and a fourth port, and configured to distribute and synthesize radio frequency signals;

a first transmission line, a second transmission line, a third transmission line, and a fourth transmission line respectively connected to the first port, the second port, the third port, and the fourth port;

a first radio frequency circuit connected to the first port through the first transmission line and configured to perform at least one of transmission and reception of a radio frequency signal via the first port through the first transmission line; and two external connection terminals individually connected to the third port and the fourth port, wherein the distributing/synthesizing circuit is configured to:

distribute the radio frequency signal input to the first port, to the third port, and to the fourth port, synthesize radio frequency signals that are reflected by a radiating element connected to the external connection terminal and that are input to the third port and the fourth port, and output the synthesized radio frequency signal to the second port, and the second transmission line is longer than each of the first transmission line, the third transmission line, and the fourth transmission line.

12. The antenna module according to claim 11, wherein the distributing/synthesizing circuit, the first transmission line, the second transmission line, the third transmission line, and the fourth transmission line are provided on a common substrate, and the antenna module further comprises:

at least one second radiating element provided on the substrate;

a second radio frequency circuit configured to perform at least one of transmission and reception of a radio frequency signal to and from each of the at least one second radiating element; and a fifth transmission line provided on the substrate and connected between the second radio frequency circuit and each of the at least one second radiating element, and the second transmission line is longer than the fifth transmission line.

13. The antenna module according to claim 12, wherein a surface roughness of the second transmission line is larger than surface roughnesses of each of the first transmission line, the third transmission line, and the fourth transmission line.

14. The antenna module according to claim 12, wherein a dielectric loss tangent of at least a part of a dielectric material disposed in a region overlapping the second transmission line in a plan view is larger than a dielectric loss tangent of a dielectric material disposed in a region overlapping the first transmission line, the third transmission line, and the fourth transmission line.

15. The antenna module according to claim 12, wherein the first radio frequency circuit supplies a radio frequency signal with a frequency equal to or higher than 20 GHz to the first radiating element.

16. The antenna module according to claim 12, wherein a chip resistor element is not connected to the first transmission line.

17. The antenna module according to claim 11, wherein a surface roughness of the second transmission line is larger than surface roughnesses of each of the first transmission line, the third transmission line, and the fourth transmission line.

18. The antenna module according to claim 11, wherein a dielectric loss tangent of at least a part of a dielectric material disposed in a region overlapping the second transmission line in a plan view is larger than a dielectric loss tangent of a dielectric material disposed in a region overlapping the first transmission line, the third transmission line, and the fourth transmission line.

19. The antenna module according to claim 11, wherein the first radio frequency circuit supplies a radio frequency signal with a frequency equal to or higher than 20 GHz to the first radiating element.

20. The antenna module according to claim 11, wherein a chip resistor element is not connected to the first transmission line.

* * * * *